US009225447B2

(12) United States Patent
Chen et al.

(10) Patent No.: US 9,225,447 B2
(45) Date of Patent: Dec. 29, 2015

(54) METHOD AND DEVICE FOR TRANSMITTING APERIODIC SRS IN TDD SYSTEM

(71) Applicants: Wenhong Chen, Beijing (CN); Xueming Pan, Beijing (CN); Qiubin Gao, Beijing (CN); Yu Ding, Beijing (CN)

(72) Inventors: Wenhong Chen, Beijing (CN); Xueming Pan, Beijing (CN); Qiubin Gao, Beijing (CN); Yu Ding, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 0 days.

(21) Appl. No.: 13/691,745

(22) Filed: Dec. 1, 2012

(65) Prior Publication Data

US 2013/0182618 A1 Jul. 18, 2013

Related U.S. Application Data

(63) Continuation of application No. PCT/CN2011/079707, filed on Sep. 16, 2011.

(30) Foreign Application Priority Data

Sep. 17, 2010 (CN) .......................... 2010 1 0285801

(51) Int. Cl.
*H04J 3/16* (2006.01)
*H04L 5/14* (2006.01)
*H04L 5/00* (2006.01)

(52) U.S. Cl.
CPC ............ *H04J 3/1694* (2013.01); *H04L 5/0048* (2013.01); *H04L 5/1469* (2013.01); *H04L 5/0078* (2013.01)

(58) Field of Classification Search
CPC ........... H04J 3/1694; H04L 1/00; H04L 1/16; H04L 5/00; H04L 5/0078
USPC .................. 370/328, 329, 280, 294, 345, 254
See application file for complete search history.

(56) References Cited

U.S. PATENT DOCUMENTS

2008/0298497 A1* 12/2008 Cho et al. ...................... 375/295
2009/0186613 A1* 7/2009 Ahn et al. ..................... 455/434

(Continued)

FOREIGN PATENT DOCUMENTS

| CN | 101808409 | 8/2010 |
|---|---|---|
| EP | 2166694 | 3/2010 |
| WO | 2009041881 | 4/2009 |

OTHER PUBLICATIONS

R1-080799, 3GPP TSG RAN WG1 meeting #52 Sounding reference signals in UpPTS for TDD.*

(Continued)

*Primary Examiner* — Andrew Lai
*Assistant Examiner* — Mahmudul Hasan
(74) *Attorney, Agent, or Firm* — Ladas & Parry, LLP

(57) ABSTRACT

Disclosed are a method and a device for transmitting an aperiodic SRS in a TDD system. In the technical solution of the present invention, a symbol is defined for the transmission of the aperiodic SRS in a special subframe in the TDD system. This avoids a scenario in which the transmission position of the aperiodic SRS is undefined when a plurality of symbols that can be used to transmit the aperiodic SRS are available in an uplink pilot time slot (UpPTS). The problem of transmitting aperiodic SRS in a TDD system special subframe is thus solved. The modification to corresponding instruction messages is not extensive, and there is no overuse of system resources.

17 Claims, 3 Drawing Sheets

(56) References Cited

U.S. PATENT DOCUMENTS

| | | | |
|---|---|---|---|
| 2009/0219897 A1* | 9/2009 | Pajukoski et al. | 370/336 |
| 2009/0232118 A1* | 9/2009 | Wang et al. | 370/338 |
| 2009/0323664 A1* | 12/2009 | Li | H04L 27/2611 370/344 |
| 2010/0040005 A1* | 2/2010 | Kim | H04J 11/0069 370/329 |
| 2010/0067410 A1* | 3/2010 | He et al. | 370/280 |
| 2010/0165931 A1* | 7/2010 | Nimbalker | H04L 1/0028 370/329 |
| 2010/0195532 A1* | 8/2010 | Pajukoski | H04L 5/06 370/254 |
| 2010/0238845 A1* | 9/2010 | Love | H04B 7/15528 370/280 |
| 2010/0246561 A1* | 9/2010 | Shin | H04W 52/32 370/345 |
| 2010/0278083 A1* | 11/2010 | Kwak et al. | 370/280 |
| 2010/0303019 A1* | 12/2010 | Iwai | H04L 5/0007 370/328 |
| 2010/0309852 A1* | 12/2010 | Li | H04L 5/0048 370/328 |
| 2010/0322115 A1* | 12/2010 | Wei | H04L 25/0224 370/280 |
| 2011/0013546 A1* | 1/2011 | Hao | H04L 5/0007 370/294 |
| 2011/0080896 A1* | 4/2011 | Krishnamurthy | H04W 56/0045 370/336 |
| 2011/0116436 A1* | 5/2011 | Bachu | H04L 5/0048 370/312 |
| 2011/0141928 A1* | 6/2011 | Shin | H04L 1/0028 370/252 |
| 2012/0076115 A1* | 3/2012 | Noh et al. | 370/336 |

OTHER PUBLICATIONS

R1-081327,3GPP TSG RAN WG1 meeting #52bis Sounding reference signals in UpPTS for TDD.*
Application No. 2010102858019; Text of the Notification of the First Office Action.*
IRPP for related PCT/CN2011/079707 dated Apr. 23, 2013 and its English translation.
ISR for related PCT/CN2011/079707 mailed on Dec. 29, 2011 and its English translation.
WO for related PCT/CN2011/079707 mailed on Dec. 29, 2011 and its English translation.
3GPP TSG RAN WG1 meeting #52 R1-080799.
3GPP TSG RAN WG1 meeting #52bis R1-081327.
Office Action for related Chinese patent application 201010285801.9 dated Jul. 22, 2013 and its English translation.

* cited by examiner

METHOD AND DEVICE FOR TRANSMITTING APERIODIC SRS IN TDD SYSTEM

CROSS REFERENCE TO RELATED APPLICATIONS

This application is a continuation of PCT/CN2011/079707 filed on Sep. 16, 2011, which claims priority to Chinese Patent Application No. 201010285801.9 entitled "Method and Device for Transmitting Aperiodic SRS in TDD System" filed in the Patent Office of the People's Republic of China on Sep. 17, 2010, the disclosures of which are hereby incorporated by reference in their entireties.

FIELD OF THE INVENTION

The present invention relates to the field of communication technology, in particular to the method and device for transmitting aperiodic SRS in TDD system.

BACKGROUND OF THE PRESENT INVENTION

In present LTE (Long Term Evolution) system, the sounding of uplink channel is completed through sounding signal, which is sent through the last symbol of terminal at SRS (Sounding Reference Signal) subframe. The base station can obtain the uplink channel information and thus conduct resource scheduling and measurement for the uplink transmission, including measurement of RI (Rank Indication)/PMI (Precoding Matrix Indicator)/CQI (Channel Quality Indication), etc. SRS in LTE system is periodically sent, that is, sounding signal is sent continually by terminal in a certain period till getting into the status of no data transmission. The parameters of periodic SRS are configured through high layer, including CS (Cycle Shift), bandwidth, frequency hopping parameter, period and position of sending subframe, etc. of SRS.

Due to long scheduling period and low scheduling efficiency, the periodic SRS frequently occupies many physical resources. In particular in LTE-A (Long Term Evolution Advanced) system, UE (User Equipment) is frequently required to send multi-antenna SRS simultaneously, thus causing much higher resource consumption. To improve SRS resource utilization and reduce SRS resource consumption, aperiodic SRS transmission is introduced into LTE-A system. Unlike the periodic SRS, aperiodic SRS is dynamically activated by the base station. After activation, the terminal shall send sounding signal once only instead of periodically. Through aperiodic sounding, the base station can more flexibly acquire the channel information required and close or reduce transmission of the periodic SRS when it is available so as to reduce physical resource consumption of SRS.

Single-antenna port transmission and multi-antenna port transmission can be adopted for aperiodic SRS. For the latter, the base station transmits aperiodic SRS signal on all transmitting antennae simultaneously.

According to present conclusions, aperiodic SRS is triggered by one bit or some bits in DCI (Downlink Control Information) format for scheduling the uplink/downlink transmission in PDCCH (Physical Downlink Control Channel).

Supposing aperiodic SRS is triggered at the $N^{th}$ subframe, aperiodic SRS will be sent at the nearest one or several SRS subframes after 4 subframes. Generally such timing proceeds with subframe as unit. Cell-level parameters configuration of the periodic SRS are multiplexed for configuring time domain resource of aperiodic SRS while configuration parameters, including bandwidth, starting position, etc. of aperiodic SRS may be indicated by high layer signaling or by certain special DCI format. There is no special subframe in FDD (Frequency Division Duplexing) system, each subframe can be SRS subframe and there is one sounding symbol at most, so if aperiodic SRS is triggered, the sounding will be conducted according to configuration parameters in sounding symbol on corresponding SRS subframe based on the timing. For TDD (Time Division Duplexing) system, there are special subframes and UpPTS (Uplink Pilot Time Slot) may have two symbols that can be used for sounding, so if aperiodic SRS is triggered and transmitted in the special subframes, additional standardization will be required for transmitting aperiodic SRS in two sounding symbols to determine which symbol or symbols are used for transmitting aperiodic SRS. The diagram of TDD system frame structure in the present technology is shown in FIG. 1.

In prior art, no technical solution can solve the problems above. If simply based on the present conclusions, the symbol of the special subframe on which SRS is sent will be undeterminable.

SUMMARY OF THE INVENTION

The embodiments of the present invention provide a method and device for transmitting an aperiodic SRS in a TDD system. Certain symbol or symbols are defined for the transmission of the aperiodic SRS in a special subframe in the TDD system, so the problem of transmitting aperiodic SRS in a special subframe of TDD system is thus solved.

To achieve the above purpose, on one hand, the embodiments of the present invention provide a method for transmitting aperiodic sounding signal SRS, comprising:

When receiving a message on activating aperiodic SRS sent by The equipment at network side, the terminal equipment determines whether the subframe in which aperiodic SRS will be sent is a special subframe;

When the terminal equipment determines that the subframe in which aperiodic SRS will be sent is a special frame, such equipment sends aperiodic SRS to The equipment at network side through corresponding symbols of uplink pilot time-slot in the special subframes according to the second strategy.

Besides, the embodiments of the present invention also provide a kind of terminal equipment, comprising:

Strategic module, is used for determining the primary and secondary strategies corresponding to the terminal equipment;

Determination module, is used for determining whether the subframe in which aperiodic SRS will be sent is a special subframe determined by the strategic module when the terminal equipment receives the message on activating aperiodic SRS sent by The equipment at network side;

Sending module, is used for sending aperiodic SRS to The equipment at network side through corresponding symbols of uplink pilot time-slot in the special subframes according to the second strategy determined by the strategic module when the determination module determines subframes of aperiodic SRS to be sent are special.

In addition, the embodiments of the present invention also provide a method for transmitting aperiodic SRS in TDD system, comprising:

When sending the message on activating aperiodic SRS to the terminal equipment, The equipment at network side determines whether it is necessary for the terminal equipment to send aperiodic SRS in special subframes in accordance with the first strategy;

When The equipment at network side determines it is necessary for the terminal equipment to send aperiodic SRS in special subframes, such equipment receives aperiodic SRS sent by the terminal equipment through corresponding symbols of uplink pilot time-slot in the special subframes in accordance with the second strategy.

In a further aspect, the embodiments of the present invention also provide a kind of equipment at network side, which comprises:

Strategic module, is used for determining the primary and secondary strategies corresponding to each terminal equipment;

Determination module, is used for determining whether it is necessary for the terminal equipment to send aperiodic SRS in special subframes according to the first strategy determined by the strategic module when The equipment at network side sends the message on activating aperiodic SRS to the network side;

Receiving module, is used for receiving aperiodic SRS sent by the terminal equipment through corresponding symbols of uplink pilot time-slot in the special subframes in accordance with the second strategy determined by the strategic module when the strategic module determines the subframes of aperiodic SRS to be sent as special.

Compared with present technology, the embodiments of the present invention have the following advantages:

Technical solution of the embodiments of the present invention is applied and a symbol is defined for the transmission of the aperiodic SRS in a special subframe in the TDD system. This avoids a scenario in which the transmission position of the aperiodic SRS is undefined when a plurality of symbols that can be used to send the aperiodic SRS are available in an uplink pilot time slot (UpPTS). The problem of transmitting aperiodic SRS in a TDD system special subframe is thus solved. The modification to corresponding instruction messages is not extensive, and there is no overuse of system resources.

DETAILED DESCRIPTION OF PREFERRED EMBODIMENTS

Figure 1:
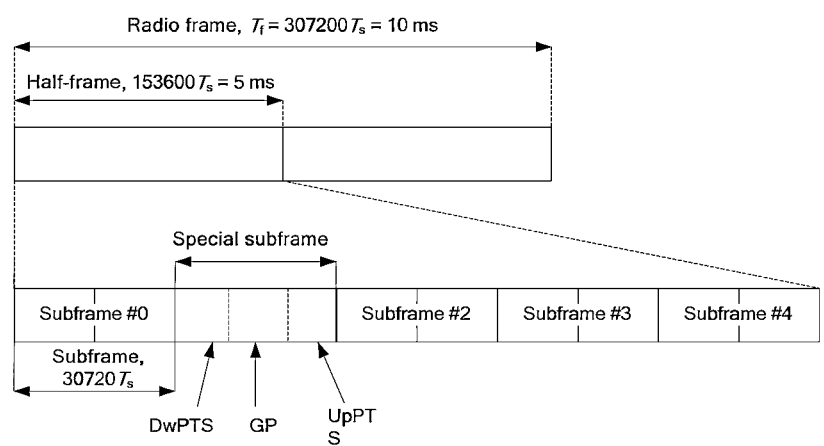
FIG. 1 is a schematic diagram of TDD system frame structure in prior art.

In LTE-A system, multi-antenna transmission is introduced, so periodic SRS needs to occupy more physical resources. To improve SRS resource utilization and reduce SRS resource consumption, aperiodic SRS transmission is introduced in LTE-A and one-off sounding is activated through dynamic scheduling.

However, for there are special subframes in TDD system and UpPTS in the special subframes may have two symbols that can be used for sounding, namely, to send aperiodic SRS.

So how to determine a symbol for the transmission of aperiodic SRS is a problem that needs to be solved urgently.

The embodiments of the present invention provide a method for transmitting an aperiodic SRS in a TDD system. When it is necessary to transmit aperiodic SRS in special subframes, terminal equipment and equipment at network side determine the symbol for transmitting aperiodic SRS through corresponding strategy and complete the transmission of the aperiodic SRS through this symbol.

To achieve the above purpose, firstly, it is required to configure the same judgment strategy in the terminal equipment and equipment at network side whether it is necessary to send aperiodic SRS in special subframes, which is the first strategy.

In the practical application, the first strategy covers the following two kinds of contents:

(1) The terminal equipment treats the special subframe as a single SRS subframe to time aperiodic SRS.

(2) The terminal equipment treats each symbol included in uplink pilot time-slot of special subframes as an independent opportunity for sending aperiodic SRS, to time aperiodic SRS.

Through the first strategy, the terminal equipment and the equipment at network side can determine whether it is necessary to send aperiodic SRS in special subframes.

And then, if it is necessary to transmit aperiodic SRS in special subframes, it will be required to configure the same strategy for transmission of aperiodic SRS in the special subframes in the terminal equipment and the equipment at network side, which is the second strategy.

In the technical solution put forward by the embodiments of the present invention, corresponding to the contents of the first strategy, the transmission strategy configured in the terminal equipment and The equipment at network side comprises the following two:

Strategy I, when the first strategy refers that the terminal equipment treats the special subframe as a single SRS subframe to time aperiodic SRS, the second strategy is specifically symbol indexes for sending aperiodic SRS.

This symbol index can be configured through the following three methods:

Case I, The symbol indexes to send aperiodic SRS in uplink pilot time-slot preset in terminal equipments and equipment at network side.

In this case, it is necessary to set the same symbol index in the terminal equipment and The equipment at network side. Such setting can be realized through setting the same content of symbol index respectively in the terminal equipment and The equipment at network side, or through establishing corresponding symbol index standard, that is, setting corresponding symbol index in initialization settings of the terminal equipment and The equipment at network side, thus making all terminal equipments and The equipment at network side in the system transmit aperiodic SRS in special subframes based on the same configuration.

In the specific application context, such setting of symbol index can be divided into the following two cases:

(1) Send aperiodic SRS through a fixed symbol in uplink pilot time-slot.

That is, the terminal equipment and The equipment at network side do not additionally indicate or consult the symbol for transmitting aperiodic SRS, but transmit aperiodic SRS through a fixed symbol. For example, set the first symbol in the uplink pilot time slot as the fixed one to transmit aperiodic SRS, when the uplink pilot time slot has only one symbol available for sending aperiodic SRS, the terminal equipment transmits aperiodic SRS directly through this symbol. And when the uplink pilot time slot has two symbols available for sending aperiodic SRS, the terminal equipment selects the first one to transmit aperiodic SRS.

The same rule is set at the equipments at network side, so aperiodic SRS also can be received at the side of equipment at network side through corresponding symbol.

(2) Send aperiodic SRS through all symbols available for sending aperiodic SRS in uplink pilot time-slot.

That is, no matter the uplink pilot time slot has either one or two symbols available for sending aperiodic SRS, the terminal equipment shall use all of them for sending aperiodic SRS and The equipment at network side shall receive aperiodic SRS in these symbols.

Furthermore, when the uplink pilot time slot has multiple symbols available for sending aperiodic SRS, the aperiodic SRS transmitted in all symbols can be process through the following methods:

A. Aperiodic SRS is transmitted in each symbol through the same frequency domain resource.

B. Aperiodic SRS is sent in each symbol through the method of frequency-domain hopping.

For example, when the uplink pilot time slot has two symbols available for sending aperiodic SRS, based on scheme B, the frequency domain position of aperiodic SRS in the two symbols changes according to the predefined rule and can be different frequency domain resources.

In the specific application context, which method shall be applied can be adjusted according to actual demand and such change shall not influence protection scope of the present invention.

Case II, The symbol indexes to send aperiodic SRS in uplink pilot time-slot acquired through downlink messages.

This case is a dynamic symbol index indication method. Firstly determine the symbol index at the side of equipment at network side for sending aperiodic SRS in uplink pilot time-slot and then send such symbol index to corresponding terminal equipment through downlink messages to enable the terminal equipment to transmit aperiodic SRS in corresponding symbols according to this symbol index.

In the specific application context, The equipment at network side informs symbol index through the following two methods:

(1) The terminal equipment receives symbol index through the independent symbol index indication message.

That is, a new notification message of symbol index is added in the system and sent by The equipment at network side to the terminal equipment, which carries the symbol index for sending aperiodic SRS in uplink pilot time-slot. The terminal equipment receives such message and acquires corresponding symbol index information therefrom to complete the determination on the strategy for the transmission of aperiodic SRS in this step.

For example: when the uplink pilot time slot has two symbols available for sending aperiodic SRS, The equipment at network side directly indicates the terminal through 1 bit high layer signaling to use the first or the second symbol for sending aperiodic SRS. Such bit is indicated together with configuration parameter for the transmission of aperiodic SRS.

(2) The terminal equipment receives symbol index through the indication message of configuration information of aperiodic SRS.

That is, it is unnecessary to add any new notification message of symbol index in the system, but the indication message of configuration information of existing aperiodic SRS carries the symbol index for sending aperiodic SRS in uplink pilot time-slot, or the symbol index applied is informed to the terminal equipment through an implicit method when informing the configuration information of aperiodic SRS.

Specifically, according to different types of configuration information of aperiodic SRS, the method for informing symbol index in this case also involves the following situations:

A. Use the downlink message of CS used for indicating aperiodic SRS to simultaneously indicate the symbol index for sending aperiodic SRS in uplink pilot time-slot.

Specific indicating methods mean directly carrying symbol indexes for sending aperiodic SRS in uplink pilot time-slot in the downlink message, namely explicit indicating methods.

Or the methods can be mapping indication as shown in Table 1 below, to directly indicate CS used for indicating aperiodic SRS, and the terminal equipment can determine corresponding symbol index according to the corresponding relation between specific CS value and the symbol index.

TABLE 1

Mapping Table of Cyclic Shift (CS) Indication and Symbol Index

| Cycle shift indication (CSI) of aperiodic SRS | Sounding symbol indexes {0, 1} |
|---|---|
| {0, 1, 2, 3} | 0 |
| {4, 5, 6, 7} | N − 1 |

Wherein, N refers to the quantity of symbols available for sending aperiodic SRS in uplink pilot time-slot and N is equal to 1 or 2.

According to the above indication, if the uplink pilot time slot has two symbols available for sending aperiodic SRS (N=2), when the value of CS indicated in the indication message sent by The equipment at network side is 4, the terminal equipment selects the second symbol for transmitting aperiodic SRS.

During such implicit processing, it is unnecessary to transmit additional symbol indexes. However, the aforementioned mapping relation needs to be preset on terminal equipments so that such equipments can conduct mapping judgment.

B. Use the downlink message for indicating frequency domain position to simultaneously indicate the symbol index for sending aperiodic SRS in uplink pilot time-slot.

Specific indicating methods mean directly carrying symbol indexes for sending aperiodic SRS in uplink pilot time-slot in the downlink message, namely explicit indicating methods.

Or the methods can be mapping indication as shown in Table 2 below, to directly indicate initial position of frequency domain, and the terminal equipment can determine corresponding symbol index according to the corresponding relation between specific initial position of frequency domain and the symbol index.

TABLE 2

Mapping Table of Frequency Domain Initial Position and Symbol Index

| Initial position of frequency domain | Sounding symbol indexes {0, 1} |
|---|---|
| Odd number | 0 |
| Even number | N − 1 |

Wherein, N refers to the quantity of symbols available for sending aperiodic SRS in uplink pilot time-slot and N is equal to 1 or 2.

According to the above indication, if the uplink pilot time slot has two symbols available for sending aperiodic SRS (N=2), when the value of frequency domain initial position indicated in the indication message sent by The equipment at network side is an odd number, the terminal equipment selects the first symbol for transmitting aperiodic SRS.

During such implicit processing, it is unnecessary to transmit additional symbol indexes. However, the aforementioned mapping relation needs to be preset on terminal equipments so that such equipments can conduct mapping judgment.

C. Use the downlink message for indicating Comb to simultaneously indicate the symbol index for sending aperiodic SRS in uplink pilot time-slot.

Specific indicating methods mean directly carrying symbol indexes for sending aperiodic SRS in uplink pilot time-slot in the downlink message, namely explicit indicating methods.

Or the methods can be mapping indication as shown in Table 3 below, to directly indicate the value of Comb, and the terminal equipment can determine corresponding symbol index according to the corresponding relation between specific Comb value and the symbol index.

TABLE 3

Mapping Table of Comb and Symbol Index

| Value of Comb | Sounding symbol indexes {0, 1} |
|---|---|
| 0 | 0 |
| 1 | N − 1 |

Wherein, N refers to the quantity of symbols available for sending aperiodic SRS in uplink pilot time-slot and is equal to 1 or 2.

According to the above indication, if the uplink pilot time slot has two symbols available for sending aperiodic SRS (N=2), when the value of Comb indicated in the indication message sent by The equipment at network side is 1, the terminal equipment selects the second symbol for transmitting aperiodic SRS.

During such implicit processing, it is unnecessary to transmit additional symbol indexes. However, the aforementioned mapping relation needs to be preset on terminal equipments so that such equipments can conduct mapping judgment.

In the practical application context, that which method is specifically applied for indicating symbol indexes shall not influence protection scope of the present invention.

Case III, the terminal equipment determines symbols for sending aperiodic SRS in uplink pilot time-slot according to user system parameters and index algorithm agreed with The equipment at network side.

In this case, the terminal equipment can acquire the symbol for sending aperiodic SRS through the method agreed with The equipment at network side according to some user system parameters, such as RNTI (Radio network temporary identifier), namely, a user ID allocated by a cell to each terminal equipment.

For example, if the uplink pilot time slot of the terminal equipment has two symbols available for sending aperiodic SRS, the symbol index actually used for sending aperiodic SRS can be expressed as: $n_{SRS}=n_{RNTI} \bmod 2$, wherein, $n_{RNTI}$ is RNTI value of this user.

Compared with using fixed symbols to send aperiodic SRS, the advantage of this method is that the opportunity for each symbol in UpPTS to send sounding is in a more balanced distribution, thus avoiding the situation that the terminal equipment sends aperiodic SRS centrally on a symbol.

Strategy II, when the first strategy is that the terminal equipment treats each symbol comprised in uplink pilot time-slot of special subframes as an independent opportunity for sending aperiodic SRS to time aperiodic SRS, the second strategy is specifically the symbol index determined during the timing of aperiodic SRS in the terminal equipment and The equipment at network side.

In this case, the terminal equipment directly enters the symbol comprised in uplink pilot time-slot in the form of an independent opportunity for sending aperiodic SRS into transmission timing of aperiodic SRS, that is, such one or more symbols can serve as the timing unit equivalent to other subframes that can transmit aperiodic SRS so as to time the aperiodic SRS. After receiving activation indication of aperiodic SRS, corresponding position shall be selected for sending aperiodic SRS according to corresponding timing rule.

The specific examples of this case shall be explained in the subsequent embodiments, so no unnecessary details will be given here.

Figure 2:
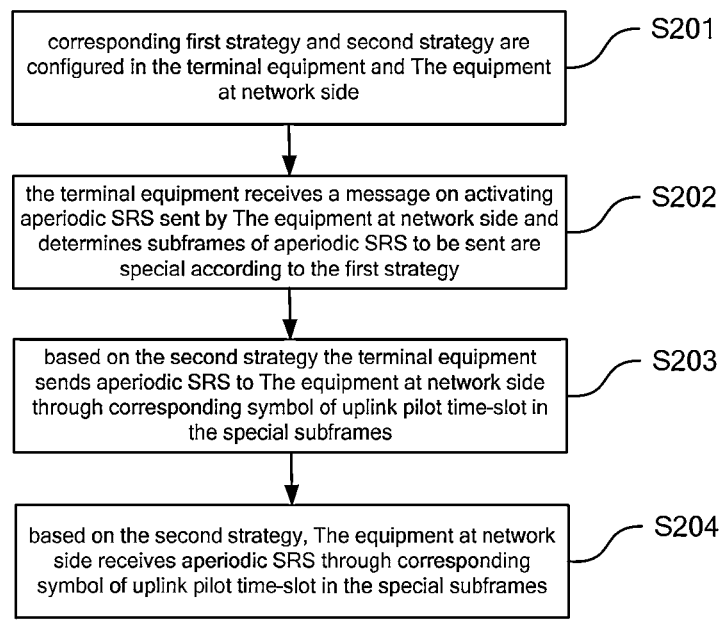
FIG. 2 is a flow diagram of a method for transmitting aperiodic SRS in a TDD system put forward by the embodiments of the present invention.

Based on the aforesaid various strategies, the technical solution put forward by the embodiments of the present invention is specifically explained below:

FIG. 2 shows a flow diagram of a method for transmitting aperiodic SRS in a TDD system put forward by the embodiments of the present invention. The method comprises the following steps specifically:

Step S201, corresponding first strategy and second strategy are configured in the terminal equipment and The equipment at network side.

The specific configuration method and content are as the aforesaid and will not be explained again.

Step S202, the terminal equipment receives a message on activating aperiodic SRS sent by The equipment at network side and determines subframes of aperiodic SRS to be sent are special according to the first strategy.

Step S203, based on the second strategy the terminal equipment sends aperiodic SRS to The equipment at network side through corresponding symbol of uplink pilot time-slot in the special subframes.

In this step, corresponding to transmission strategies in case I, case II and case III in strategy I, the terminal equipment can directly determine the symbol for sending aperiodic SRS according to the symbol index determined in step S201. Or corresponding to strategy II, in case that each symbol in uplink pilot time-slot which can be used for sending aperiodic SRS is used as an independent opportunity for sending aperiodic SRS, the symbol for sending aperiodic SRS also can be determined through aperiodic SRS timing.

Step S204, based on the second strategy, The equipment at network side receives aperiodic SRS through corresponding symbol of uplink pilot time-slot in the special subframes.

The second strategy set at the terminal equipment and The equipment at network side is consistent and the message on activating aperiodic SRS is also sent by The equipment at network side to the terminal equipment, so The equipment at network side can determine the symbol for transmitting aperiodic SRS according to the same strategy and receive aperiodic SRS based on corresponding results.

Compared with present technology, the embodiments of the present invention have the following advantages:

Technical solution of the embodiments of the present invention is applied and a symbol is defined for the transmission of the aperiodic SRS in a special subframe in the TDD system. This avoids a scenario in which the transmission position of the aperiodic SRS is undefined when a plurality of symbols that can be used to send the aperiodic SRS are available in an uplink pilot time slot (UpPTS). The problem of transmitting aperiodic SRS in a TDD system special subframe is thus solved. The modification to corresponding instruction messages is not extensive, and there is no overuse of system resources.

The technical solution put forward by the embodiments of the present invention will be explained in combination with actual implementation site.

Corresponding to the three cases in strategy I, the symbol for transmitting aperiodic SRS is directly determined according to symbol indexes, so no other explanation will be given. In the following embodiments, the application of transmission strategy in strategy II will be explained.

Particularly, if the transmission of aperiodic SRS is triggered once only every time when The equipment at network side sends the message on activating aperiodic SRS, for TDD system, supposing aperiodic SRS is triggered at the $N^{th}$ subframe, the terminal equipment sends aperiodic SRS at the $K^{th}$ SRS transmission opportunity through aperiodic SRS transmission timing, therein, K−N≥4 and the subframe of transmission opportunity K must be a SRS subframe in the system.

However, for transmission strategy in strategy II, the terminal equipment treats the symbol comprised in uplink pilot time-slot as an independent opportunity for sending aperiodic SRS, so during timing for aperiodic SRS sending, the terminal equipment does not only use SRS subframe in the system as timing unit but also time the symbol set as an independent opportunity for sending aperiodic SRS, that is, taking such symbol as timing unit. Such processing is realized through the mapping relation between the specific subframe index n and SRS transmission opportunity index $k_{SRS}$ as shown in Table 4.

sion of the aperiodic SRS in a special subframe in the TDD system. This avoids a scenario in which the transmission position of the aperiodic SRS is undefined when a plurality of symbols that can be used to send the aperiodic SRS are available in an uplink pilot time slot (UpPTS). The problem of transmitting aperiodic SRS in a TDD system special subframe is thus solved. The modification to corresponding instruction messages is not extensive, and there is no overuse of system resources.

Figure 3:
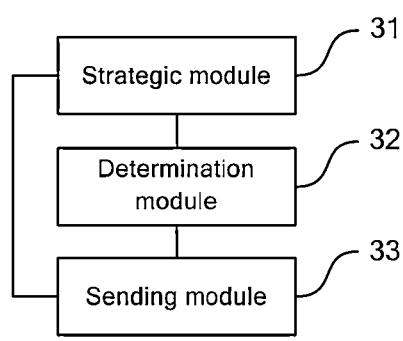
FIG. 3 is a structure diagram of a kind of terminal equipment put forward by the embodiments of the present invention.

To realize the technical solution in the embodiments of the present invention, such embodiments also provide a kind of terminal equipment, whose structure diagram is shown in FIG. 3, comprising:

Strategic module 31 for determining the primary and secondary strategies corresponding to the terminal equipment;

Determination module 32 for determining whether the subframe in which aperiodic SRS will be sent is a special subframe determined in accordance with the strategic module 31 when the terminal equipment receives the message on activating aperiodic SRS sent by The equipment at network side;

Sending module 33 for sending aperiodic SRS through corresponding symbols of uplink pilot time-slot in the special subframes according to the second strategy determined by the strategic module 31 when the determination module 32 determines subframes of aperiodic SRS to be sent are special.

TABLE 4

Mapping Table of Subframe Index n and SRS Transmission Opportunity Index $k_{SRS}$

| SRS transmission opportunity index $k_{SRS}$ | Subframe index n | | | | | | | | | | | |
| --- | --- | --- | --- | --- | --- | --- | --- | --- | --- | --- | --- | --- |
| | | 1 | | | | | | 6 | | | | |
| | 0 | The first symbol of UpPTS | The second symbol of UpPTS | 2 | 3 | 4 | 5 | The first symbol of UpPTS | The second symbol of UpPTS | 7 | 8 | 9 |
| Length of UpPTS is equal to 2 symbols | | 0 | 1 | 2 | 3 | 4 | | 5 | 6 | 7 | 8 | 9 |
| Length of UpPTS is equal to 1 symbol | | 1 | | 2 | 3 | 4 | | 6 | | 7 | 8 | 9 |

It is specifically formulated. Supposing terminal equipment receives the information on triggering aperiodic SRS in the $n_t$ subframe of the $n_f$ frame, the terminal equipment sends aperiodic SRS in the $n'_f$ frame and the transmission opportunity meets $(10*n'_f + k_{SRS} - 10*n_f - n_t) \geq 4$. For TDD system, the mapping relation between $k_{SRS}$ and subframe index n is given in Table 4 and the subframe n in which $k_{SRS}$ is located must meet $n \bmod T_{SFC} \in \Delta_{SFC}$ ($T_{SFC}$ and $\Delta_{SFC}$ are cell-level configuration parameters of SRS and are respectively configuring period and cell SRS subframe offset for cell SRS subframe). Wherein, $n'_f$ is the minimum frame number meeting $(10*n'_f + k_{SRS} - 10*n_f - n_t) \geq 4$ and $n'_f \geq n_f$.

The technical solution put forward by the embodiments of the present invention is widely applicable and can be used for uplink transmission in case of any antenna number and antenna array (such as linear array and polarized array), any duplex system (TDD system or FDD system) and any sending mode (such as SU-MIMO, MU-MIMO and CoMP).

Compared with present technology, the embodiments of the present invention have the following advantages:

Technical solution of the embodiments of the present invention is applied and a symbol is defined for the transmis- Wherein, corresponding to the first strategy, the determination module 32 determines whether subframes of aperiodic SRS to be sent are special according to the following two strategies:

(1) Set the special subframe as a single SRS subframe to time aperiodic SRS.

(2) Each symbol comprised in uplink pilot time-slot of the special subframes is set as an independent opportunity for sending aperiodic SRS, to time aperiodic SRS.

In addition, when the determination module 32 determines the subframe in which aperiodic SRS will be sent is a special frame, corresponding to the first strategy, the second strategy for sending aperiodic SRS determined by the strategic module 31 also comprises the following two cases:

(1) When the first strategy determined by the strategic module 31 is that the terminal equipment treats the special subframe as a single SRS subframe to time aperiodic SRS, the second strategy determined by the strategic module 31 specifically comprises:

A. The symbol indexes to send aperiodic SRS in uplink pilot time-slot preset in terminal equipments and the equipment at network side.

In this case, The symbol indexes to send aperiodic SRS, specifically:

Send aperiodic SRS through a fixed symbol in uplink pilot time-slot; or,

Send aperiodic SRS through all available symbols in uplink pilot time-slot, therein, all available symbols in uplink pilot time-slot are used for sending aperiodic SRS in the same frequency domain resource or by means of frequency-domain hopping.

B. The symbol indexes to send aperiodic SRS in uplink pilot time-slot received by the terminal equipment and sent by The equipment at network side through downlink messages.

In this case, the process of determining symbol indexes of aperiodic SRS specifically comprises:

Determine to The symbol indexes to send aperiodic SRS sent in uplink pilot time-slot sent by The equipment at network side through the independent symbol index indication message; or, Determine to The symbol indexes to send aperiodic SRS sent in uplink pilot time-slot sent by The equipment at network side in an implicit method through the indication message of aperiodic SRS configuration information.

C. The terminal equipment determines symbols for sending aperiodic SRS in uplink pilot time-slot according to user system parameters and index algorithm agreed with The equipment at network side.

In this case, it is necessary to agree corresponding user system parameters and index algorithm for the terminal equipment and The equipment at network side.

(2) When the first strategy determined by the strategic module 31 is that the terminal equipment treats each symbol comprised in uplink pilot time-slot of special subframes as an independent opportunity for sending aperiodic SRS to time aperiodic SRS, the second strategy determined by the strategic module 31 is specifically:

The symbol indexes to send aperiodic SRS in uplink pilot time-slot determined during the timing of aperiodic SRS interminal equipments and The equipment at network side.

In this case, the strategic module 31 determines the second strategy as the process of symbol indexes for sending aperiodic SRS in uplink pilot time-slot determined during the timing, which is specifically:

Subframe indexes in the TDD system are mapped as transmission opportunity indexes of SRS;

Set the symbol comprised in uplink pilot time-slot as an independent opportunity for sending aperiodic SRS and conduct transmission timing for aperiodic SRS according to transmission opportunity index of SRS to determine subframes and transmission opportunity for transmitting aperiodic SRS.

Based on various cases above, sending module 32 is specifically used for:

When the second strategy determined by the strategic module 31 is symbol indexes for sending aperiodic SRS in uplink pilot time-slot preset or sent by The equipment at network side, send aperiodic SRS to The equipment at network side through symbol corresponding to symbol indexes in uplink pilot time-slot. Or when the second strategy determined by the strategic module 31 is sending symbols of aperiodic SRS in uplink pilot time-slot determined according to the agreed user system parameters and index algorithm, send aperiodic SRS to The equipment at network side through this symbol.

When the second strategy determined by the strategic module 31 is symbol indexes for sending aperiodic SRS in uplink pilot time-slot determined during the timing, send aperiodic SRS to The equipment at network side through this symbol.

Figure 4:
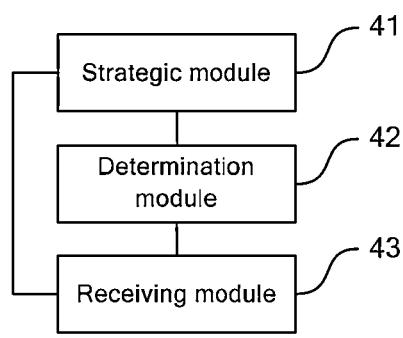
FIG. 4 is a structure diagram of a kind of equipment at network side put forward by the embodiments of the present invention.

Correspondingly, the embodiments of the present invention also provide a kind of equipment at network side, whose structure diagram is shown in FIG. 4, comprising:

Strategic module 41 for determining the primary and secondary strategies corresponding to each terminal equipment;

Determination module 42 for determining whether it is necessary for the terminal equipment to send aperiodic SRS in special subframes according to the first strategy determined by the strategic module 41 when The equipment at network side sends the message on activating aperiodic SRS to the terminal equipment;

Receiving module 43 for receiving aperiodic SRS sent by the terminal equipment through corresponding symbol of uplink pilot time-slot in the special subframes according to the second strategy determined by the strategic module 41 when the determination module 42 determines subframes of aperiodic SRS to be sent are special.

Wherein, corresponding to the first strategy, the determination module 42 determines whether subframes of aperiodic SRS to be sent are special according to the following two strategies:

(1) Set the special subframe as a single SRS subframe to time aperiodic SRS.

(2) Each symbol comprised in uplink pilot time-slot of the special subframes is set as an independent opportunity for sending aperiodic SRS, to time aperiodic SRS.

In addition, when the determination module 42 determines the subframe in which aperiodic SRS will be sent is a special frame, corresponding to the first strategy, the second strategy for sending aperiodic SRS determined by the strategic module 41 also comprises the following two cases:

(1) When the first strategy determined by the strategic module 41 is that the special subframe is set as a single SRS subframe to time aperiodic SRS, the second strategy determined by the strategic module 41 specifically comprises:

A. The symbol indexes to send aperiodic SRS in uplink pilot time-slot preset in terminal equipments and the equipment at network side.

B. The symbol indexes to send aperiodic SRS in uplink pilot time-slot sent by The equipment at network side through downlink messages to the terminal equipment.

C. The equipment at network side determines the symbol for sending aperiodic SRS in uplink pilot time-slot according to user system parameters and index algorithm corresponding to and agreed with the terminal equipment.

(2) When the first strategy determined by the strategic module 41 is that each symbol comprised in uplink pilot time-slot of special subframes is set as an independent opportunity for sending aperiodic SRS to time aperiodic SRS, the second strategy determined by the strategic module 41 is specifically:

The symbol indexes to send aperiodic SRS in uplink pilot time-slot determined during the timing of aperiodic SRS interminal equipments and The equipment at network side.

The detailed explanation is similar to that in the embodiments corresponding to the terminal equipment, so no more explanation is given here.

Based on various cases above, sending module 43 is specifically used for:

When the second strategy determined by the strategic module 41 is symbol indexes for sending aperiodic SRS in uplink pilot time-slot preset or sent by The equipment at network side, receive aperiodic SRS sent by the terminal equipment through the symbol corresponding to symbol index in uplink pilot time-slot. Or when the second strategy determined by the strategic module 41 is sending symbols of aperiodic SRS in uplink pilot time-slot determined according to the agreed user system parameters and index algorithm, receive aperiodic SRS sent by the terminal equipment through this symbol.

When the second strategy determined by the strategic module 41 is symbol indexes for sending aperiodic SRS in uplink pilot time-slot determined during the timing, receive aperiodic SRS sent by the terminal equipment through this symbol.

Compared with present technology, the embodiments of the present invention have the following advantages:

Technical solution of the embodiments of the present invention is applied and a symbol is defined for the transmission of the aperiodic SRS in a special subframe in the TDD system. This avoids a scenario in which the transmission position of the aperiodic SRS is undefined when a plurality of symbols that can be used to send the aperiodic SRS are available in an uplink pilot time slot (UpPTS). The problem of transmitting aperiodic SRS in a TDD system special subframe is thus solved. The modification to corresponding instruction messages is not extensive, and there is no overuse of system resources.

With the description of the preferred embodiments hereinabove, technical personnel of the field can clearly understand that the present invention can be realized with the aid of software and necessary commonly used hardware platforms, or the aid of hardware of course, but the former is a preferred embodiment in most cases. Based on this understanding, the technical proposal of the present invention or the part contributing to the present technology can be reflected in the form of a software product, which is saved in a memory medium comprising instructions to enable a computer equipment, which could be a personal computer, a server or a network device, to carry out the methods for each embodiment of the present invention.

Technical personnel of the field can understand that the drawings only refer to the diagram of a preferred embodiment, and the module or procedure is not necessary for the implementation of the embodiments of the present invention.

Technical personnel of the field can understand that the module in the unit of an embodiment can be distributed in such unit based on embodiment description, or located in one or more units of another embodiment through corresponding changes. Modules of the embodiments mentioned above can be merged into one module, or further divided into a plurality of submodules.

The number of the aforementioned embodiments of the present invention is only used for description rather than for representing advantages or disadvantages.

Only several specific embodiments of the present invention are released above. However, the present invention is not only comprised of those. Any change that technical personnel of the field can predict shall be protected by the present invention.

The invention claimed is:

1. A method for transmitting aperiodic sounding reference signal (SRS) in time division duplex (TDD) system, comprising:
   when receiving a message on activating aperiodic SRS sent by an equipment at network side, a terminal equipment determines whether the subframe in which aperiodic SRS will be sent is a special subframe according to a first strategy;
   when the terminal equipment determines that the subframe in which aperiodic SRS will be sent is the special frame, the terminal equipment sends the aperiodic SRS to the equipment at network side through corresponding symbols of uplink pilot time-slot in the special subframe according to a second strategy;
   wherein, the first strategy comprising:
      the terminal equipment treats the special subframe as a single SRS subframe to time aperiodic SRS; or,
      the terminal equipment treats each symbol comprised in uplink pilot time-slot of the special subframe as an independent opportunity for sending aperiodic SRS to time aperiodic SRS.

2. The method as claimed in claim 1, wherein,
   when the first strategy is that the terminal equipment treats the special subframe as a single SRS subframe to time aperiodic SRS, the second strategy specifically comprises:
   symbol indexes for sending aperiodic SRS in uplink pilot time-slot preset in the terminal equipment and the equipment at the network side; or,
   symbol indexes for sending aperiodic SRS in uplink pilot time-slot received by the terminal equipment and sent by the equipment at network side through a downlink message; or,
   the terminal equipment determines symbols for sending aperiodic SRS in uplink pilot time-slot according to user system parameters and index algorithm agreed with the equipment at network side;
   when the first strategy is that the terminal equipment treats each symbol comprised in uplink pilot time-slot of special subframes as an independent opportunity for transmitting aperiodic SRS to time aperiodic SRS, the second strategy is specifically:
   the symbol indexes for sending aperiodic SRS in uplink pilot time-slot timing determined by the terminal equipments and the equipment at network side.

3. The method as claimed in claim 2, wherein, the symbol indexes for sending aperiodic SRS in uplink pilot time-slot preset in the terminal equipment and the equipment at network side, wherein:
   symbol indexes of a fixed symbol in uplink pilot time-slot determined by the terminal equipment for sending aperiodic SRS; or,
   symbol indexes of all available symbols in uplink pilot time-slot determined by the terminal equipment for sending aperiodic SRS.

4. The method as claimed in claim 3, wherein, for the symbol indexes of all available symbols,
   the terminal equipment determines to send aperiodic SRS through all available symbols in uplink pilot time-slot in the same frequency domain resource; or,
   the terminal equipment determine to send aperiodic SRS through all available symbols in uplink pilot time-slot through the method of frequency-domain hopping.

5. The method as claimed in claim 1, wherein, the terminal equipment treats each symbol comprised in uplink pilot time-slot of the special subframes as an independent opportunity for sending aperiodic SRS, wherein:
   the terminal equipment maps subframe indexes in the TDD system as transmission opportunity indexes of SRS;
   the terminal equipment conducts transmission timing for aperiodic SRS according to transmission opportunity indexes of SRS to determine subframes and transmission opportunity for transmitting aperiodic SRS.

6. The method as claimed in claim 2, wherein, when terminal equipment determines the subframe in which aperiodic SRS will be sent is a special frame, the terminal equipment sends aperiodic SRS to the equipment at network side through corresponding symbols of uplink pilot time-slot in the special subframes according to the second strategy, wherein:
   when the second strategy is symbol indexes for sending aperiodic SRS in uplink pilot time-slot preset or sent by the equipment at network side, the terminal equipment sends aperiodic SRS to the equipment at network side through symbols corresponding to symbol indexes in uplink pilot time-slot; Or when the second strategy is symbols for sending aperiodic SRS in uplink pilot time-slot determined according to the agreed user system parameters and index algorithm, the terminal equipment sends aperiodic SRS to the equipment at network side directly through the symbols;

when the second strategy is symbol indexes for sending aperiodic SRS in uplink pilot time-slot determined during the timing of aperiodic SRS in the terminal equipments and the equipment at network side, the terminal equipment sends aperiodic SRS to the equipment at network side through symbols which symbol indexes corresponding to.

7. A terminal equipment, comprising:

strategic module, is used for determining a first strategy and a second strategy corresponding to the terminal equipment;

determination module, is used for determining whether a subframe in which aperiodic SRS will be sent is a special subframe determined by the strategic module when the terminal equipment receives a message on activating aperiodic SRS sent by an equipment at network side;

sending module, is used for sending aperiodic SRS to the equipment at network side through corresponding symbols of uplink pilot time-slot in the special subframes according to a second strategy determined by the strategic module when the determination module determines subframes of aperiodic SRS to be sent are special;

wherein, the first strategy determined by the strategic module comprising:

the special subframe is set as a single SRS subframe to time aperiodic SRS; or, each symbol comprised in uplink pilot time-slot of the special subframes is set as an independent opportunity for sending aperiodic SRS, to time aperiodic SRS.

8. The terminal equipment as claimed in claim 7, wherein, when the first strategy determined by the strategic module is that the terminal equipment treats the special subframe as a single SRS subframe to time aperiodic SRS, the second strategy determined by the strategic module specifically comprises:

the symbol indexes to send aperiodic SRS in uplink pilot time-slot preset in terminal equipments and equipment at network side; or, the symbol indexes to send aperiodic SRS in uplink pilot time-slot received by the terminal equipment and sent by the equipment at network side through downlink messages; or, the terminal equipment determines symbols for sending aperiodic SRS in uplink pilot time-slot according to user system parameters and index algorithm agreed with the equipment at network side;

when the first strategy determined by the strategic module is that the terminal equipment treats each symbol comprised in uplink pilot time-slot of the special subframes as an independent opportunity for sending aperiodic SRS to time aperiodic SRS, the second strategy determined by the strategic module is specifically:

the symbol indexes to send aperiodic SRS in uplink pilot time-slot determined during the timing of aperiodic SRS in terminal equipments and the equipment at network side.

9. The terminal equipment as claimed in claim 8, wherein, when the second strategy determined by the strategic module is symbol indexes for sending aperiodic SRS in uplink pilot time-slot preset in the terminal equipment, wherein the symbol indexes for sending aperiodic SRS:

send aperiodic SRS through a fixed symbol in uplink pilot time-slot; or, send aperiodic SRS through all available symbols in uplink pilot time-slot, therein, all available symbols in uplink pilot time-slot are used for sending aperiodic SRS in the same frequency domain resource or by means of frequency-domain hopping.

10. The terminal equipment as claimed in claim 8, wherein, the strategic module determines the second strategy as the process of symbol indexes for sending aperiodic SRS in uplink pilot time-slot determined during the timing of aperiodic SRS in the terminal equipments and the equipment at network side, wherein:

subframe indexes in the TDD system are mapped as transmission opportunity indexes of SRS;

set the symbol comprised in uplink pilot time-slot as an independent opportunity for transmitting aperiodic SRS and conduct transmission timing for aperiodic SRS according to the transmission opportunity index of SRS to determine subframes and transmission opportunity for transmitting aperiodic SRS.

11. The terminal equipment as claimed in claim 8, wherein, the sending module is used for:

when the second strategy determined by the strategic module is symbol indexes for sending aperiodic SRS in uplink pilot time-slot preset or sent by the equipment at network side, send aperiodic SRS to the equipment at network side through symbols which symbol indexes corresponding to in uplink pilot time-slot; or when the second strategy determined by the strategic module is sending symbols of aperiodic SRS in uplink pilot time-slot determined according to the agreed user system parameters and index algorithm, send aperiodic SRS to the equipment at network side through the corresponding symbols;

when the second strategy determined by the strategic module is symbol indexes for sending aperiodic SRS in uplink pilot time-slot determined during the timing of aperiodic SRS in the terminal equipments and the equipment at network side, send aperiodic SRS to the equipment at network side through symbols which symbol indexes corresponding to.

12. A method for transmitting aperiodic SRS in a TDD system, comprising:

when sending a message on activating aperiodic SRS to a terminal equipment, an equipment at network side determines whether it is necessary for the terminal equipment to send aperiodic SRS in special subframes in accordance with a first strategy;

when the equipment at network side determines it is necessary for the terminal equipment to send aperiodic SRS in special subframes, such equipment receives aperiodic SRS sent by the terminal equipment through corresponding symbols of uplink pilot time-slot in the special subframes in accordance with a second strategy;

wherein, the first strategy comprising:

the equipment at network side treats the special subframe as a single SRS subframe to time aperiodic SRS; or, the equipment at network side treats each symbol comprised in uplink pilot time-slot of the special subframes as an independent opportunity for sending aperiodic SRS, to time aperiodic SRS.

13. The method as claimed in claim 12, wherein,
when the first strategy is that the equipment at network side treats the special subframe as a single SRS subframe to time aperiodic SRS, the second strategy comprising:
the symbol indexes to send aperiodic SRS in uplink pilot time-slot preset in terminal equipments and equipment at network side; or,
the symbol indexes to send aperiodic SRS in uplink pilot time-slot sent by the equipment at network side through downlink messages to the terminal equipment; or,
the equipment at network side determines symbols for sending aperiodic SRS in uplink pilot time-slot according to user system parameters and index algorithm corresponding to and agreed with the terminal equipment;
when the first strategy is that the equipment at network side treats each symbol comprised in uplink pilot time-slot of the special subframes as an independent opportunity for sending aperiodic SRS, to time aperiodic SRS, the second strategy is specifically:
the symbol indexes to send aperiodic SRS in uplink pilot time-slot determined during the timing of aperiodic SRS in terminal equipments and the equipment at network side.

14. The method as claimed in claim 13, wherein, symbol indexes for sending aperiodic SRS in uplink pilot time-slot preset in the terminal equipment and the equipment at network side, wherein:
the equipment at network side receives through a fixed symbol in uplink pilot time-slot the aperiodic SRS sent by the terminal equipment; or,
the equipment at network side receives through all available symbols in uplink pilot time-slot the aperiodic SRS sent by the terminal equipment.

15. The method as claimed in claim 14, wherein, the equipment at network side receives through all available symbols in uplink pilot time-slot the aperiodic SRS sent by the terminal equipment;
the equipment at network side receives aperiodic SRS sent by the terminal equipment in the same frequency domain resource through all symbols available for sending aperiodic SRS in uplink pilot time-slot; or,
the equipment at network side receives aperiodic SRS sent by the terminal equipment by means of frequency-domain hopping through all symbols available for sending aperiodic SRS in uplink pilot time-slot.

16. The method as claimed in claim 13, wherein, the terminal equipment and the equipment at network side take the symbol determined during the timing as an independent opportunity for sending aperiodic SRS, wherein:
the equipment at network side maps subframe indexes in the TDD system as transmission opportunity indexes of SRS;
the equipment at network side conducts transmission timing for aperiodic SRS according to transmission opportunity indexes of SRS to determine subframes and transmission opportunity for transmitting aperiodic SRS.

17. The method as claimed in claim 13, wherein, when the equipment at network side determines it is necessary for the terminal equipment to send aperiodic SRS in special subframes, the equipment at network side receives aperiodic SRS sent by the terminal equipment through corresponding symbol of uplink pilot time-slot in the special subframes according to the second strategy, wherein:
when the second strategy is symbol indexes for sending aperiodic SRS in uplink pilot time-slot preset or sent by the equipment at network side, the equipment at network side receives aperiodic SRS sent by the terminal equipment through symbols which symbol indexes corresponding to in the uplink pilot time-slot; or when the second strategy is sending symbols of aperiodic SRS in uplink pilot time-slot determined according to the agreed user system parameters and index algorithm, the equipment at network side receives aperiodic SRS sent by the terminal equipment through the corresponding symbols;
when the second strategy is symbol indexes for sending aperiodic SRS in uplink pilot time-slot determined during the timing of aperiodic SRS in the terminal equipments and the equipment at network side, the equipment at network side receives aperiodic SRS sent by the terminal equipment through symbols which symbol indexes corresponding to.

* * * * *